United States Patent Office 3,119,171
Patented Jan. 28, 1964

3,119,171
METHOD OF MAKING LOW RESISTANCE ELECTRICAL CONTACTS ON GRAPHITE
Robert E. Anderson, Austin, Tex., assignor to Texas Instruments Incorporated, Dallas, Tex., a corporation of Delaware
No Drawing. Filed July 23, 1958, Ser. No. 750,295
6 Claims. (Cl. 29—155.55)

This invention relates to electrical connections to graphite and in particular to a method of making low resistance electrical contacts on graphite.

In the prior art methods of making commutator brushes for motors, generators and similar electrical equipment, one practice has been to copper plate graphite brushes and then to solder an electrical connection to the copper. Still another practice has been to embed a connecting wire in the graphite after which the graphite is pressed around the connecting wire. In addition to providing unsatisfactory mechanical bonds, these processes have proven to be both tedious and expensive.

According to the invention, it has been discovered that when graphite is heated to a sufficient temperature in contact with indium, or an alloy of indium, and a cesium fluoride flux that the graphite absorbs the indium or indium alloy to a limited depth. It was found that a low resistance contact results therefrom providing an excellent electrical connection for the lead to the graphite. Furthermore, substantially improved mechanical strength has been observed in the connections formed according to the invention.

In some applications it is desired to produce connections capable of withstanding higher operating temperatures than are produced by the connections to the brushes formed by penetration of indium. That is, indium begins to melt at a temperature slightly in excess of 150° C. To overcome this shortcoming, a high temperature lead-indium alloy is formed after the indium has been absorbed by the graphite.

Accordingly, it is an object of the invention to provide a method of making a low resistance electrical contact on graphite in which the graphite is heated in contact with indium, or indium alloy, and a cesium fluoride flux until the indium, or indium alloy, penetrates the graphite.

Another object of the present invention is to provide a method of forming a low resistance electrical contact on graphite which is capable of withstanding operating temperatures materially in excess of 150° C.

These and other objects and advantages of the invention will become readily apparent upon a consideration of the following detailed description.

In the practice of the invention, a cesium fluoride flux is prepared by mixing equal weights of water and cesium fluoride and applied as a coating to the end of a block of graphite from which the commutator brush is made. Indium, in the form of pure indium, or indium rich alloys in either sheets, pellets or spheres is then placed in contact with the cesium fluoride flux. The quantity of indium or indium alloy to be added depends upon the size of contact desired. By an indium rich alloy is meant an alloy containing 50% or more of indium. In this respect, alloys of lead indium, silver indium and tin indium have been found to be satisfactory. The graphite brush material coated with the cesium fluoride flux which, in turn, is in contact with the indium or indium alloy is then baked in an oven at a temperature of about 1250° C. for about one minute in an oxygen free atmosphere, such as an atmosphere of helium, argon, or hydrogen. The graphite brush material is then removed and the depth of penetration of the indium is determined. This may be accomplished by scratching the surface of the graphite and observing it under a microscope. The depth of penetration of indium under the conditions described will usually be about 25 mils which is the preferred depth penetration. An electrical lead is then soldered to the indium-graphite surface, thereby forming an excellent low resistance connection. The proportions of water and cesium fluoride in the cesium fluoride flux are not critical because the flux evaporates rapidly at the oven temperature.

As an alternative, the graphite specimen may be heated without regard to time at a temperature of 1250° C. or other suitable temperature, as described hereinafter, until the indium has penetrated the graphite to the desired depth of about 25 mils.

It has been found that in order to achieve a low resistance contact with satisfactory reliability, the temperature at which the baking is performed should be in excess of 1100° C. with the optimum temperature found to be about 1250° C. Other temperature ranges have been tried. It was found that the temperature range of 850° to 1100° C. produced results which were not consistently satisfactory, although for some specimens the penetration was acceptable. A minimum acceptable depth of penetration is 5 mils. Penetrations up to nearly 100 mils are possible with continued heating, but a depth of 25 mils is preferred.

The low resistance contacts on graphite prepared by the process described thus far have the limitation of not being able to withstand operating temperatures very much in excess of 150° C. because at about that temperature the melting point of indium is reached. In order to extend the operating temperature range, it has been found that after the indium has penetrated the graphite brush material, as described, the graphite specimen may then be dipped into a bath of molten lead that is maintained at a temperature of about 400° C. In a very short period of time, less than one minute, a lead-indium alloy is formed on the surface of the graphite to about the same depth that the indium alone penetrated the graphite. This lead-indium alloy will withstand temperatures substantially in excess of 150° C. A connection is then soldered to the indium-lead alloy.

Although the invention has been described in specific embodiments, various changes and modifications obvious to one skilled in the art are within the scope, purpose and intent of this invention.

What is claimed is:
1. A method of making a low resistance contact to a graphite body comprising the steps of applying a flux of cesium fluoride to the surface of the body, heating said graphite body in contact with a material selected from the group consisting of indium and indium alloys containing at least 50% indium to a temperature and for a period of time sufficient to cause said material to penetrate said graphite body at least 5 mils and soft soldering an electrical connection to the surface formed by said material penetrating said graphite.
2. The method as set forth in claim 1 wherein the indium alloy is taken from the group consisting of lead-indium, silver-indium and tin-indium.
3. The method of claim 1 wherein the heating of said graphite body in contact with said material is at a temperature in excess of 1100° C.
4. The method of claim 1 wherein the heating of said graphite in contact with said material is continued until the material penetrates the graphite body to a desired depth between 5 and 100 mils.
5. The method of claim 1 wherein said material is indium.
6. A method of making a low resistance electrical contact to a graphite body comprising the steps of applying a flux of cesium fluoride to the surface of said body, heating said graphite body in contact with indium at a temperature and for a period of time sufficient to cause said indium to penetrate said graphite at least 5 mils, exposing said indium-penetrated graphite body to molten lead, thereby to form an alloy of lead with said indium-penetrated graphite body, and soft soldering an electrical connection to said indium-penetrated graphite and lead alloy.

References Cited in the file of this patent

UNITED STATES PATENTS

| | | |
|---|---|---|
| 2,098,062 | Palmer | Nov. 2, 1937 |
| 2,464,821 | Ludwick et al. | Mar. 22, 1949 |
| 2,509,020 | Stauffer et al. | May 23, 1950 |
| 2,717,840 | Bosch | Sept. 13, 1955 |
| 2,746,140 | Belser | May 22, 1956 |
| 2,807,561 | Nelson | Sept. 24, 1957 |
| 2,835,615 | Leinfelder et al. | May 20, 1958 |
| 2,887,416 | Amstel | May 19, 1959 |
| 2,929,137 | Jones | Mar. 22, 1960 |
| 2,937,439 | Le May | May 24, 1960 |
| 2,964,839 | Marafioti et al. | Dec. 20, 1960 |
| 2,996,800 | Holly | Aug. 22, 1961 |

FOREIGN PATENTS

| | | |
|---|---|---|
| 754,499 | Great Britain | Aug. 8, 1956 |